(12) United States Patent
Maggiore

(10) Patent No.: US 12,028,574 B2
(45) Date of Patent: Jul. 2, 2024

(54) METHOD FOR DISTRIBUTING CENSORED VIDEOS OF MANUFACTURING PROCEDURES PERFORMED WITHIN A FACILITY TO REMOTE VIEWERS

(71) Applicant: Apprentice FS, Inc., Jersey City, NJ (US)

(72) Inventor: Frank Maggiore, Jersey City, NJ (US)

(73) Assignee: Apprentice FS, Inc., Jersey City, NJ (US)

( * ) Notice: Subject to any disclaimer, the term of this patent is extended or adjusted under 35 U.S.C. 154(b) by 66 days.

(21) Appl. No.: 17/968,677

(22) Filed: Oct. 18, 2022

(65) Prior Publication Data

US 2023/0124561 A1 Apr. 20, 2023

Related U.S. Application Data

(60) Provisional application No. 63/399,137, filed on Aug. 18, 2022, provisional application No. 63/257,018, filed on Oct. 18, 2021.

(51) Int. Cl.
*G08B 13/196* (2006.01)
*G06T 7/20* (2017.01)
(Continued)

(52) U.S. Cl.
CPC ........... *H04N 21/4542* (2013.01); *G06T 7/20* (2013.01); *G06V 10/225* (2022.01); *G06V 10/25* (2022.01);

(Continued)

(58) Field of Classification Search
CPC .............................................. G08B 13/19686
See application file for complete search history.

(56) References Cited

U.S. PATENT DOCUMENTS 10,956,726 B1 3/2021 Quark et al.
2001/0017023 A1 8/2001 Armington et al.
(Continued)

OTHER PUBLICATIONS

International Search Report received in PCT/US22/47048 dated May 16, 2023.
(Continued)

*Primary Examiner* — Frank Johnson
(74) *Attorney, Agent, or Firm* — Run8 Patent Group, LLC; Peter Miller; Alexander Rodriguez

(57) ABSTRACT

One variation of the method for distributing censored videos of manufacturing procedures performed within a facility includes: accessing a video feed captured by a local device interfacing with a local operator during performance of a procedure within the facility; interpreting a set of objects depicted in the video feed based on features extracted from the video feed; accessing a minimum censorship specification for the procedure, the minimum censorship specification defining a set of object types corresponding to a first degree of censorship; identifying a subset of objects, in the set of objects, depicted in the video feed related to the procedure based on the set of object types defined in the minimum censorship specification; fogging the subset of objects in the video feed to generate a censored video feed; and serving the censored video feed to a remote viewer portal accessed by a remote viewer.

14 Claims, 7 Drawing Sheets

(51) Int. Cl.
*G06V 10/22* (2022.01)
*G06V 10/25* (2022.01)
*G06V 10/74* (2022.01)
*G06V 10/75* (2022.01)
*G06V 20/40* (2022.01)
*G06V 20/52* (2022.01)
*H04N 21/234* (2011.01)
*H04N 21/439* (2011.01)
*H04N 21/454* (2011.01)
*H04N 21/84* (2011.01)

(52) U.S. Cl.
CPC .......... *G06V 10/757* (2022.01); *G06V 10/761* (2022.01); *G06V 20/41* (2022.01); *G06V 20/46* (2022.01); *G06V 20/49* (2022.01); *G06V 20/52* (2022.01); *H04N 21/23418* (2013.01); *H04N 21/4396* (2013.01); *H04N 21/84* (2013.01); *G06V 2201/07* (2022.01)

(56) References Cited

U.S. PATENT DOCUMENTS

| | | |
|---|---|---|
| 2002/0104293 A1 | 8/2002 | Armington et al. |
| 2006/0028488 A1 | 2/2006 | Gabay et al. |
| 2006/0064384 A1* | 3/2006 | Mehrotra ......... G08B 13/19686 348/E7.086 |
| 2007/0218432 A1 | 9/2007 | Glass et al. |
| 2008/0158361 A1* | 7/2008 | Itoh .................. G08B 13/19671 348/155 |
| 2008/0309463 A1 | 12/2008 | Godzwon et al. |
| 2009/0249353 A1 | 10/2009 | Siegwart |
| 2013/0004090 A1* | 1/2013 | Kundu .................. G06V 20/52 382/284 |
| 2016/0027019 A1 | 1/2016 | Michaelangelo et al. |
| 2016/0162772 A1 | 6/2016 | Curtis |
| 2018/0017959 A1 | 1/2018 | Pandian et al. |
| 2018/0033151 A1* | 2/2018 | Matsumoto .............. H04N 7/18 |
| 2018/0136639 A1 | 5/2018 | Sekimoto et al. |
| 2018/0159979 A1 | 6/2018 | Amir et al. |
| 2018/0367474 A1 | 12/2018 | Santisteban et al. |
| 2019/0316912 A1 | 10/2019 | Maggiore et al. |
| 2020/0242952 A1 | 7/2020 | Clinton et al. |
| 2021/0074135 A1* | 3/2021 | Eswara ............... G06F 21/6254 |
| 2021/0109777 A1 | 4/2021 | Tubbs et al. |
| 2021/0227271 A1* | 7/2021 | Cox ............... H04N 21/234318 |
| 2023/0198745 A1* | 6/2023 | Vansteenkiste ....... H04W 12/02 713/168 |
| 2023/0259555 A1* | 8/2023 | Duraimanickam ... G06F 16/738 707/730 |

OTHER PUBLICATIONS

Office Action Received in U.S. Appl. No. 16/386,178 dated Oct. 5, 2021.

* cited by examiner ations, configurations, implementations, example implementations, and examples they describe. The invention described herein can include any and all permutations of these variations, configurations, implementations, example implementations, and examples.

1. Method

Figure 1:
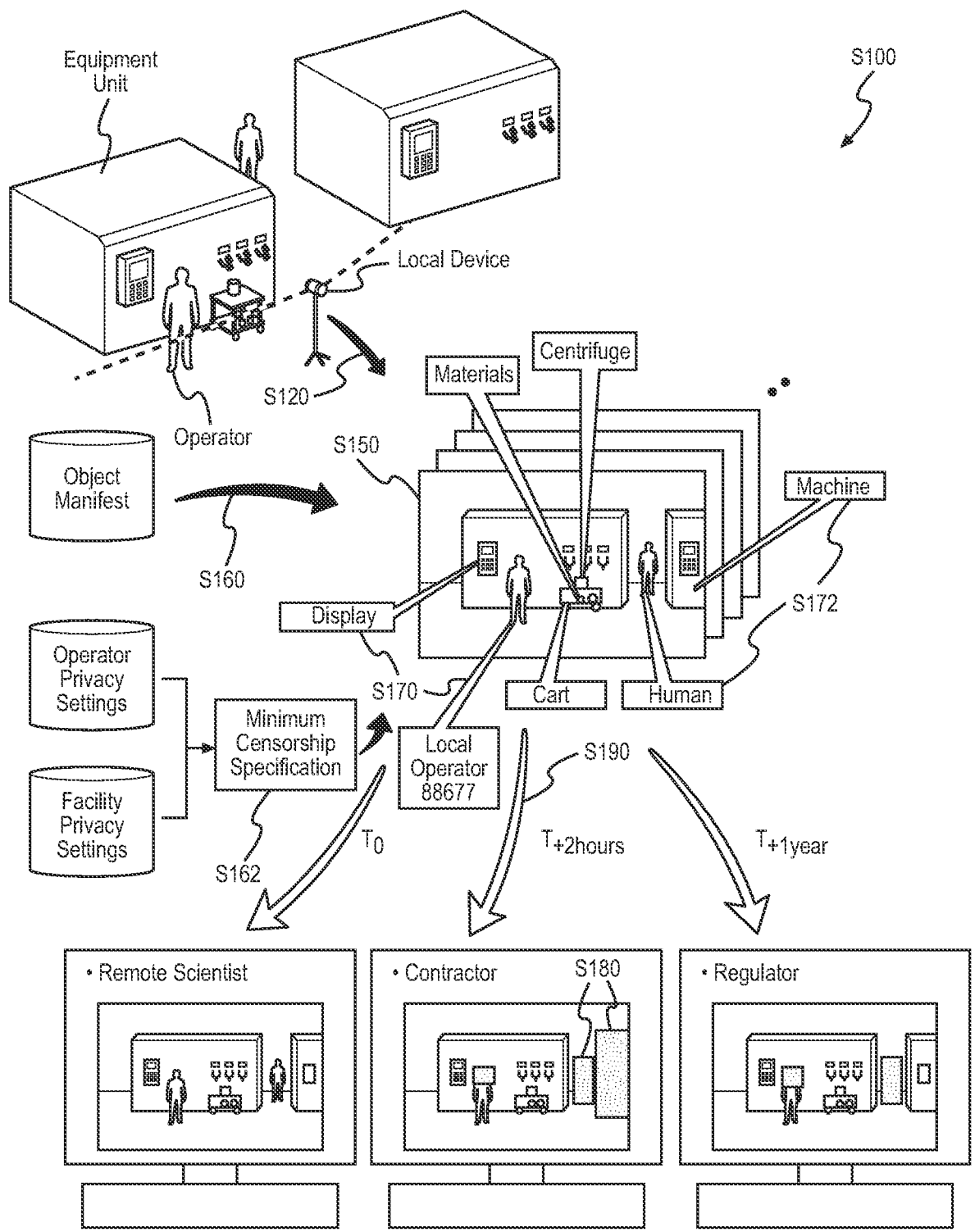
Figure 2:
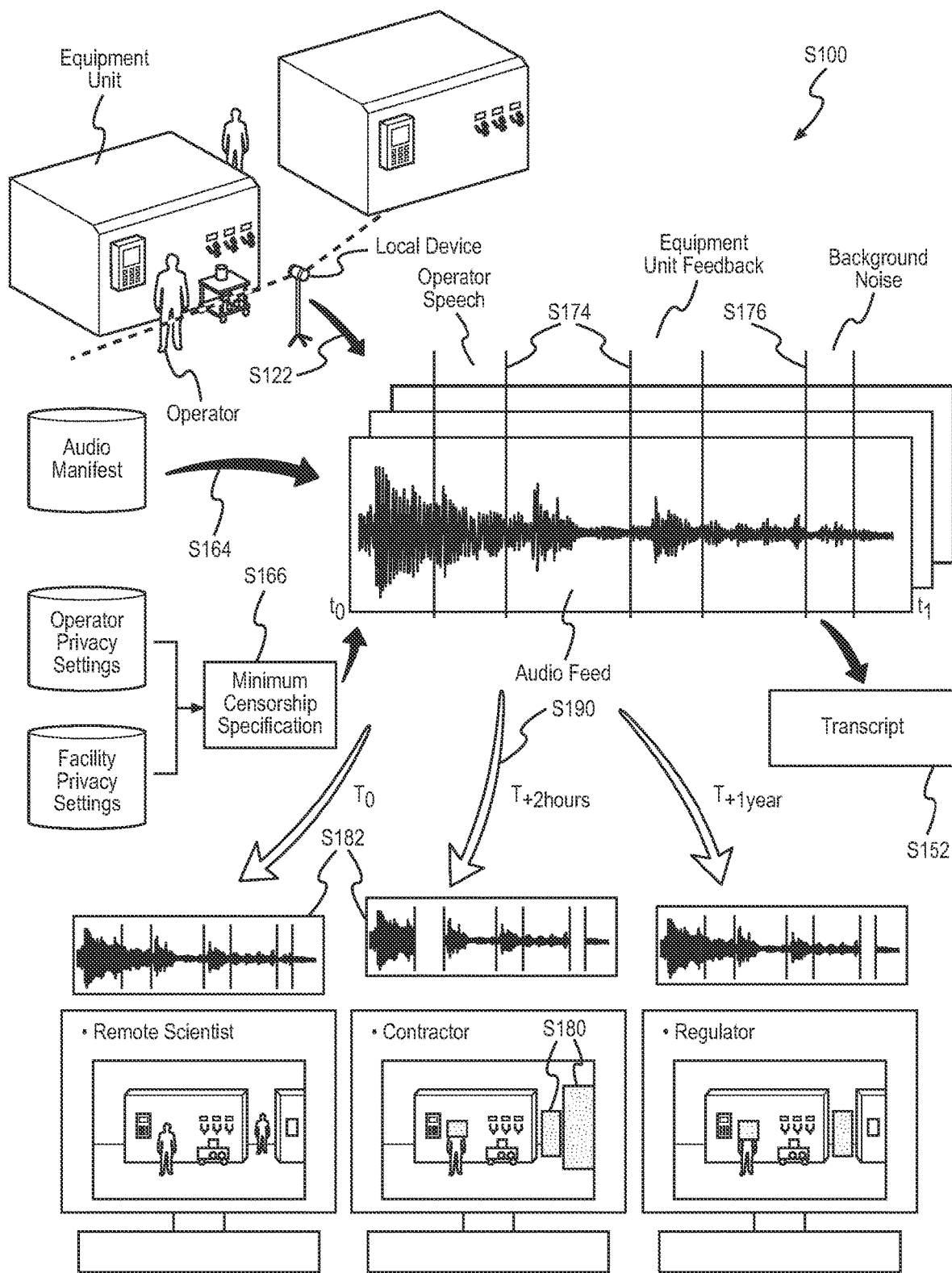
Figure 3:
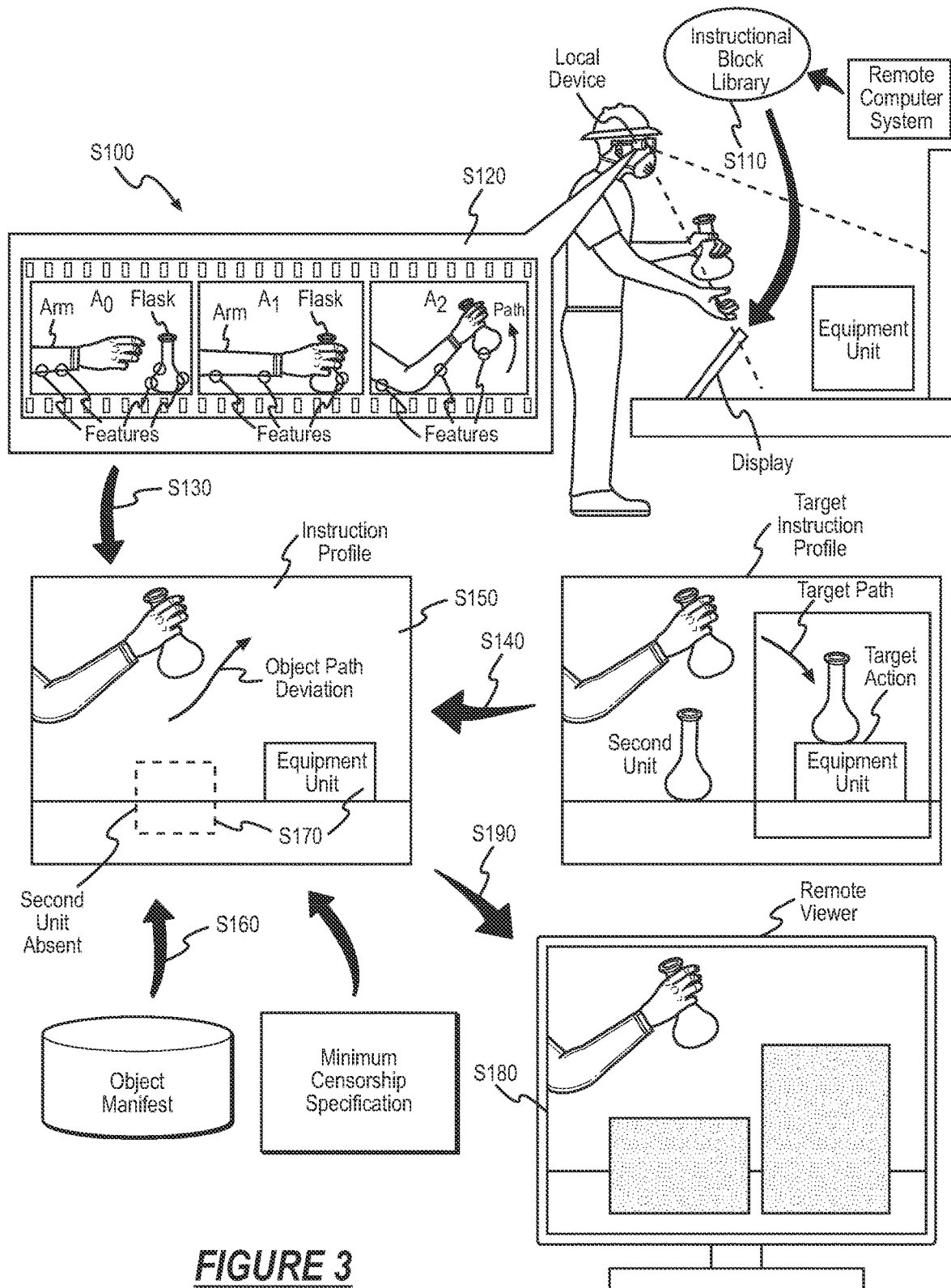
Figure 4:
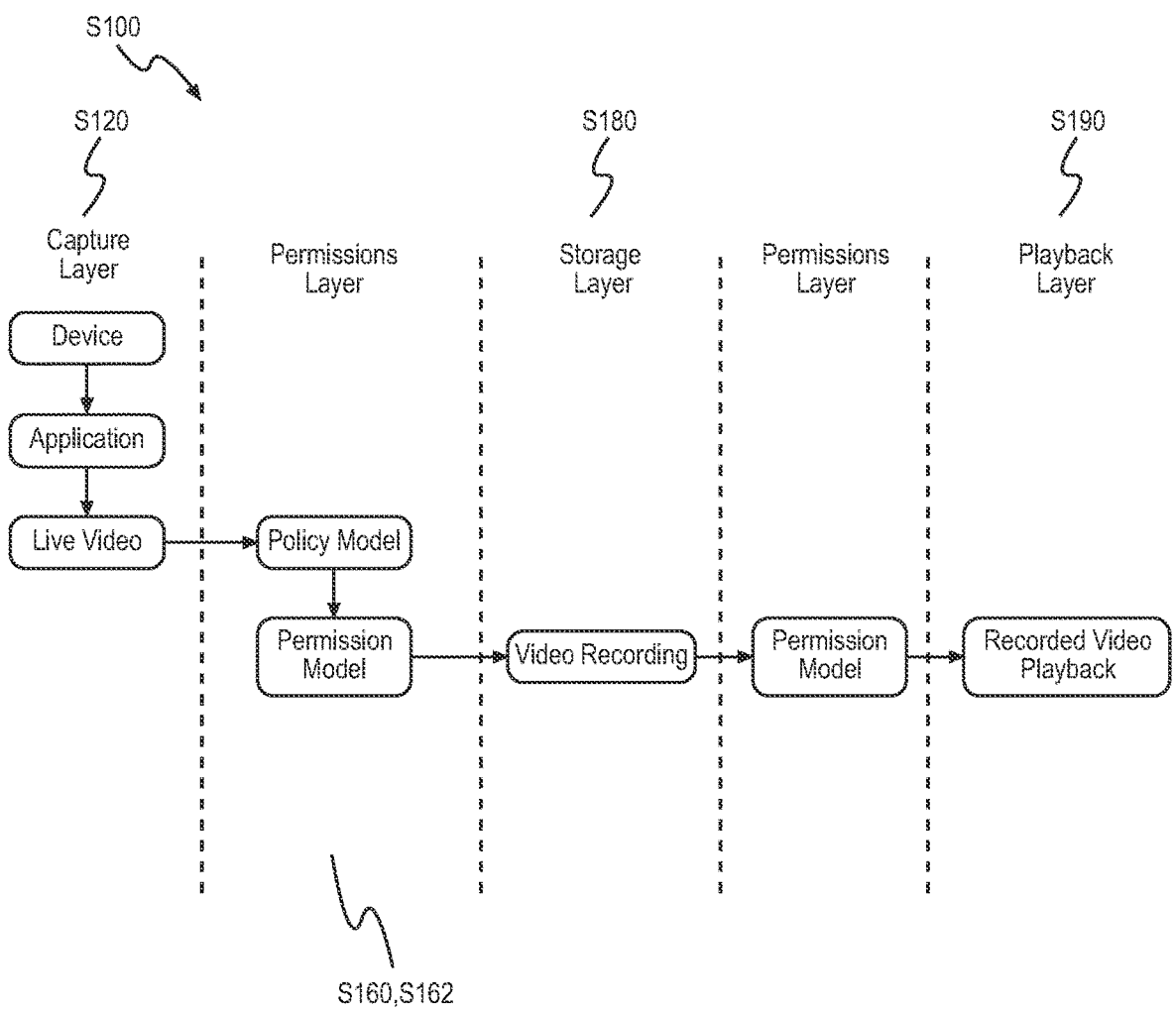
Figure 5A:
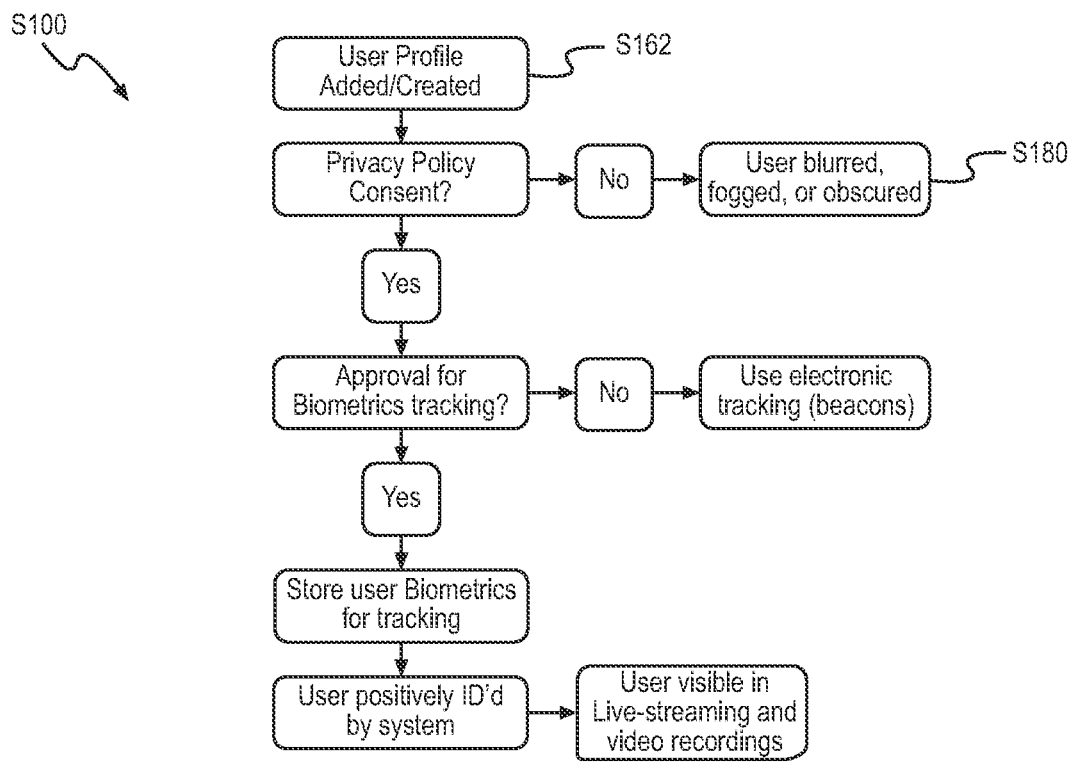
Figure 5B:
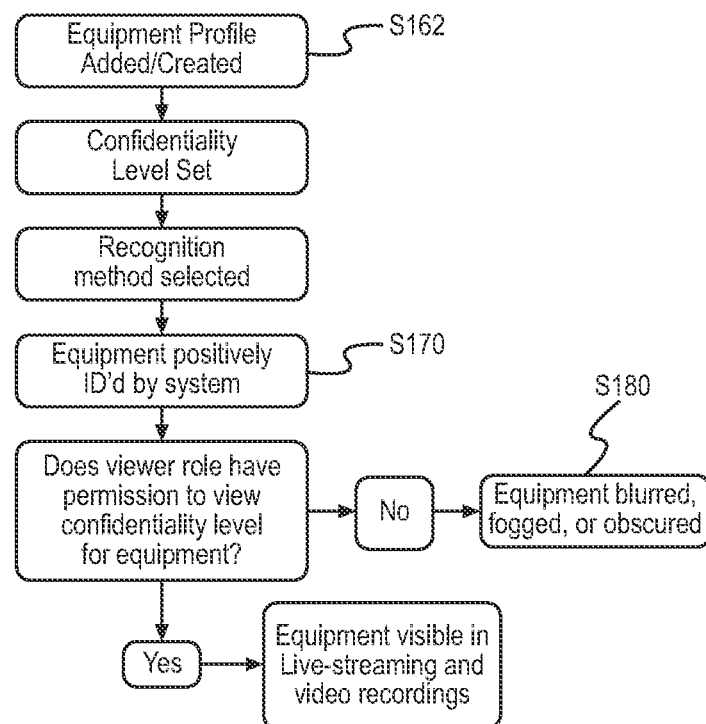
Figure 5C:
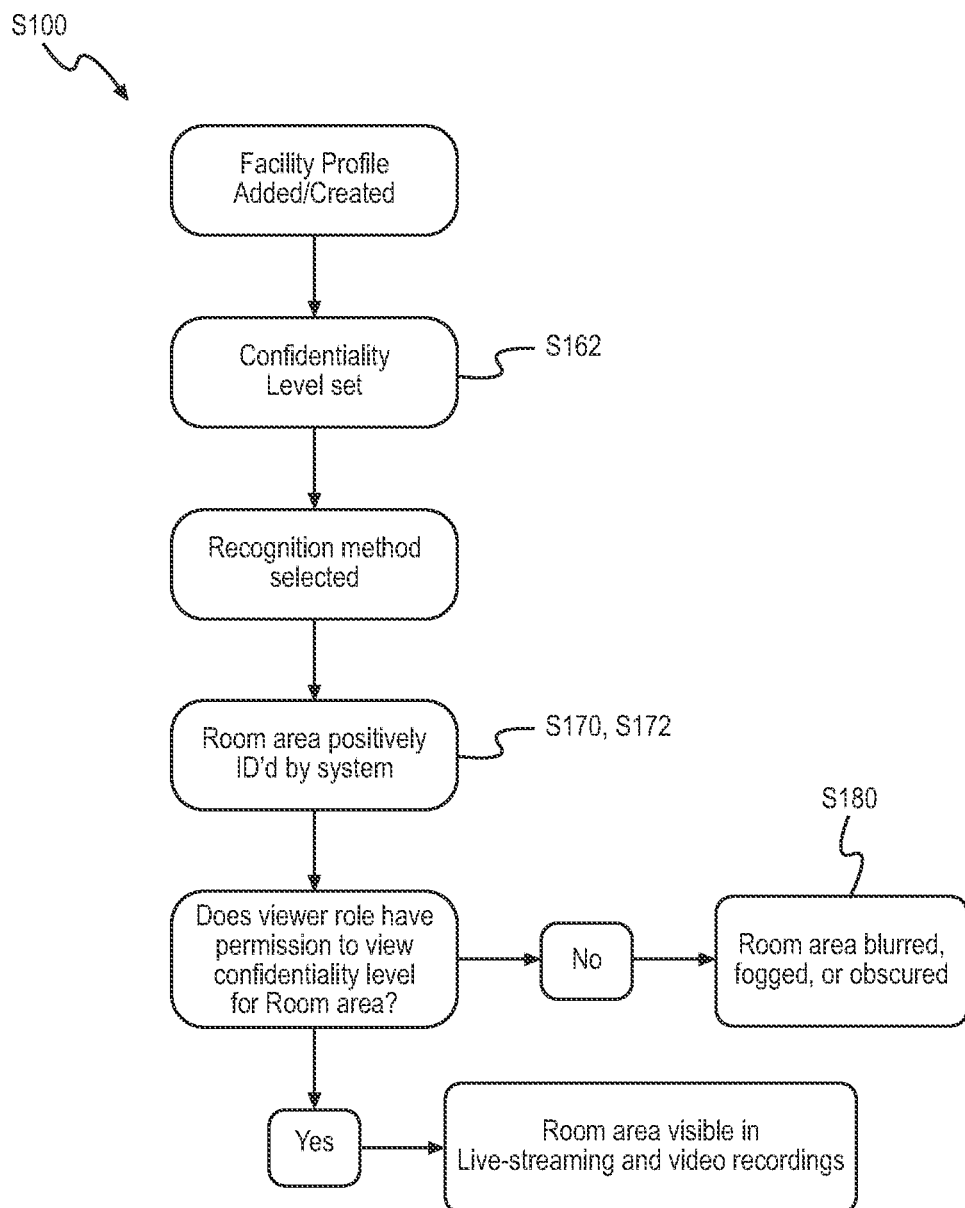
Figure 6:
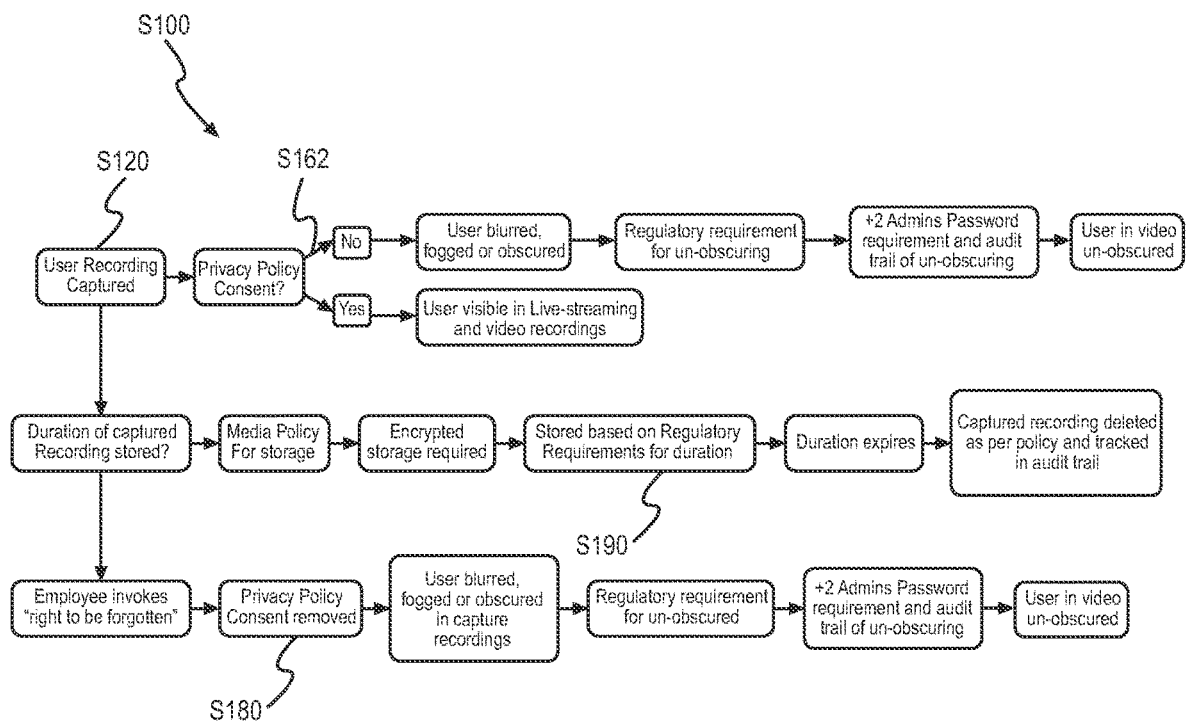

As shown in FIGS. 1, 2, and 3 a method S100 for distributing censored videos of manufacturing procedures performed within a facility to remote viewers includes: at a first time, accessing a first video feed captured by a local device interfacing with a local operator during performance of an instance of a procedure at a make line within the facility in Block S120; and interpreting a first set of objects depicted in the first video feed based on features extracted from the first video feed in Block S150.

Additionally, the method S100 includes: accessing a manifest of objects specified in the procedure in Block S160; and accessing a minimum censorship specification associated with performance of the instance of the procedure, the minimum censorship specification defining object types related to the procedure and corresponding to a first degree of censorship in Block S162.

Furthermore, the method S100 includes: identifying a first subset of objects, in the first set of objects, depicted in the first video feed related to the procedure based on the object types defined in the minimum censorship specification and the manifest of objects in Block S170; and identifying a second subset of objects, in the first set of objects, depicted in the first video feed unrelated to the instance of the procedure based on the manifest of objects in Block S172.

The method S100 also includes: fogging the first subset of objects and the second subset of objects in the first video feed to generate a censored video feed in Block S180; and serving the censored video feed to a remote viewer portal accessed by a remote viewer in Block S190.

In one variation, shown in FIGS. 1, 2, and 3, a method S100 for distributing censored videos of manufacturing procedures performed within a facility to remote viewers includes: accessing a first audio feed captured by a local device interfacing with a local operator during performance of an instance of a procedure at a make line within the facility in Block S122; and detecting a first set of audio phrases in the first audio feed based on a first set of audio features extracted from the first audio feed in Block S152.

Additionally, this variation of the method S100 includes: accessing a manifest of audio phrases specified for the procedure in Block S164; and accessing a minimum censorship specification associated with performance of the instance of the procedure, the minimum censorship specification defining audio phrase types related to the procedure and corresponding to a first degree of censorship in Block S166.

Furthermore, this variation of the method S100 includes: identifying a first subset of audio phrases, in the first set of audio phrases, related to the procedure based on the audio phrase types defined in the minimum censorship specification and the manifest of audio phrases in Block S174; and identifying a second subset of audio phrases, in the first set of audio phrases, unrelated to the procedure based on the manifest of audio phrases for the procedure in Block S176.

This variation of the method S100 also includes: muting the first set of audio phrases and the second subset of audio phrases in the first audio feed to generate a muted audio feed in Block S182; and serving the censored audio feed to a remote viewer portal accessed by a remote viewer in Block S190.

In another variation, shown in FIGS. 1, 2, and 3, a method S100 for distributing censored videos of manufacturing procedures performed within a facility to remote viewers includes: at a computing device associated with an operator, accessing a procedure containing a first instructional block including a first instruction in Block S110; and, in response to initiation of the first instructional block, accessing a first video feed captured by the computing device interfacing with the operator during performance of an instance of the first instruction at a make line within the facility in Block S120.

Additionally, this variation of the method S100 includes generating an instruction profile representing performance of the first instruction based on a first set of instruction features extracted from the first video feed in Block S130.

Furthermore, this variation of the method S100 includes, in response to identifying a deviation, exceeding a threshold deviation, between the instruction profile of the first instruction and a target instruction profile of the first instruction in the first instructional block: extracting a first set of objects depicted in the first video feed from the instruction profile in Block S150; accessing a manifest of objects specified in the first instructional block in Block S160; and identifying a first subset of objects, in the first set of objects, unrelated to the instance of the first instruction based on the manifest of objects in Block S170.

This variation of the method S100 also includes: fogging the first subset of objects in the first video feed to generate a censored video feed in Block S180; and serving the censored video feed to a remote viewer portal accessed by a remote viewer in Block S190.

2. Applications

Generally, the method can be executed by a computer system to selectively censor objects (e.g., people, equipment, materials) depicted in a video feed of an instance of a procedure performed in a manufacturing facility in order to: enforce privacy settings for a local operator performing the instance of the procedure; enforce privacy settings for other operators within the facility; enforce data access permissions for specific remote viewers or remote viewer profiles; and/or prevent data loss from other make lines in the facility that may be visible in the video feed.

More specifically, the computer system (e.g., a computer network; a local device interfacing with a local operator during an instance of the procedure; a local or remote computer system interfacing with a remote database and the local device at the instance of the procedure) can execute Blocks of the method: to access a live video feed of an instance of a procedure performed by a local operator at a particular make line (e.g., a suite of machines, tools, and equipment) within the facility; and to stream this video feed to a remote viewer portal to enable the remote viewer to verify completion of steps of the procedure, correct performance of the procedure, and/or quality control for product (e.g., pharmaceuticals) produced during the instance of the procedure.

However, other remote viewers with different credentials or access to procedure data may request access to this video feed over time. For example, a remote scientist may request access to the video feed in real-time during the instance of the procedure in order to work with the local operator to complete and verify the instance of the procedure. A manager or supervisor may request access to the video feed following completion of the instance of the procedure in order to verify particular flagged steps of the instance of the procedure (e.g., if test results or batch parameters differ from a specification defined in the procedure). A regulator may request access to the video feed following completion of the instance of the procedure in order to verify that a batch of product was correctly produced according to the procedure. A contractee who has contracted the facility to produce the regulator may request access to the video feed during or following completion of the instance of the procedure in order to track or review progress of the instance of the procedure—which may occur near other procedures in the facility on behalf of other (e.g., competing) contractees.

Furthermore, the local operator may set a privacy setting (e.g., to obscure the local operator's face, torso, and/or limbs) in the video feed of this instance of the procedure and may change this privacy setting over time.

Therefore, the computer system can execute Blocks of the method to selectively censor (or "fog," "blur") regions of live and recorded video feeds requested by remote viewers during and/or after the instance of the procedure based on the local operator's privacy settings and the remote viewers' credentials, thereby: enforcing both the local operator's privacy settings and the remote viewers' access permissions; expanding visual access to the instance of the procedure across multiple parties internal and external to the facility; and preventing data loss or data leaks outside of the facility and owners of the procedure.

The method is described herein as executed by a computer system (e.g., a computer network) in conjunction within a pharmaceutical manufacturing facility hosting multiple discrete make lines concurrently and on non-networked equipment. Accordingly, the computer system can execute Blocks of the method to simultaneously: access live video feeds of concurrent procedures in process on multiple discrete make lines within the facility; selectively censor these live video feeds based on privacy settings of local operators performing these procedures and credentials of remote viewers verifying these procedures in real-time; selectively censor stored video feeds of these instances of these procedures based on privacy settings of these local operators and credentials of remote viewers requesting post hoc access to these instances of the procedures. However, a local device (e.g., a smartphone, a laptop computer) or a remote computer system (e.g., a content distribution network) can execute Blocks of the method locally or remotely from the instance of the procedure and in conjunction with any other type or manufacturing facility producing products of any of type and on any other equipment.

Furthermore, the method S100 is described herein as executed for a 2D color video feed. However, the method can be executed by the computer system to process 2D or 3D color, depth, stereoscopic, hyperspectral, and/or other video or visual content.

3. Procedure

Generally, and as described in U.S. patent application Ser. No. 17/719,120, a paper or augmented digital document can specify a sequence of steps that form a procedure. One or a group of local operators can perform an instance of this procedure to assemble a make line, operate the make line, and/or produce a batch of product on the make line.

3.1 Loading Digital Procedure

Block S110 of the method S100 recites accessing a procedure containing a first instructional block including a first instruction. Generally, a mobile device assigned to or carried by a user can access a digital procedure in preparation for the user performing a next instance of the digital procedure.

In one implementation, a user's mobile device automatically initializes a new instance of a digital procedure based on proximity of the mobile device to a machine, equipment, or location scheduled for the corresponding procedure. In this implementation, the mobile device can track its location and orientation within the facility. As the user approaches the machine in preparation for performing this procedure, the mobile device—worn or carried by the user—can track its location within the facility and identify a particular machine with which the user is interfacing based on this location. For example, the mobile device can: determine that the mobile device is occupying a particular campus based on the mobile device's current geospatial (e.g., GPS) coordinates; determine the building, floor, and/or room that the mobile device is occupying based on wireless (e.g., Wi-Fi) connectivity in the space occupied by the mobile device; and then compare features detected in images recorded by a camera on the mobile device to a 2D or 3D localization map of the building, floor, and/or room in the facility in order to determine the position and orientation of the mobile device in real space. In this example, the mobile device (or a computer system) can then query a map of machines throughout the facility for a particular machine adjacent and facing the mobile device—and therefore the user—based on the position and orientation of the mobile device in real space. Alternatively, the mobile device can identify the particular machine directly by matching a constellation of features detected in images recorded by the camera to a known, unique constellation of features associated with this particular machine.

The mobile device can regularly execute this process to monitor its position and orientation within the facility and detect machines nearby. Then, when the user stops for more than a threshold duration of time (e.g., ten seconds) or when the mobile device determines that its location has moved less than a threshold distance within a period of time (e.g., one meter in ten seconds), the mobile device can: query the digital procedure database for a digital procedure associated with a machine nearest the current position of the mobile device; and automatically load an instance of this digital procedure for this machine, such as if this annotator portal is scheduled for completion within a current time window.

In a similar implementation, the mobile device can: rank machines in the facility by proximity to the current location of the mobile device; render a list of these machines ordered by their rank on a display of the mobile device; prompt the user to select from the list; and download an instance of a particular digital procedure associated with a machine selected by the user. For example, in Block S110, the mobile device can: track its location within the facility; detect a set of machines nearby based on a map of the facility and the location of the mobile device within the facility; retrieve a list of digital procedures associated with this set of machines; render this list of digital procedures on a display of the mobile device; download a particular digital procedure from a database (e.g., a remote server via a wireless network) in response to the user selecting this particular digital procedure from the list of digital procedures; and then initialize a new, local instance of the particular digital procedure accordingly at the mobile device.

Alternatively, the user can manually select (or "pull") the particular machine directly from a dropdown list of machines or select the particular digital procedure directly from a dropdown list of digital procedures for all machines and equipment in the facility. The mobile device can then initialize a new, local instance of this digital procedure selected manually by the user.

4. Live Video Feed

Block S120 of the method S100 recite accessing a first video feed captured by a local device interfacing with a local operator during performance of an instance of a procedure at a make line within the facility. Throughout the instance of the procedure, a local device can capture a live video feed of the local operator (or group of local operators) performing the procedure at the make line. For example, the local device can include: an augmented reality headset worn by the local operator; a tablet or smartphone placed on a work surface near the make line; a smartphone or mobile camera worn on the local operator's neck; a camera installed on a wheeled pole or cart near the make line; or a fixed camera installed on or near the make line. Thus, the local device can capture the video feed from the local operator's perspective as the local operator moves through steps of the procedure at the make line. Alternatively, the local device can capture the video feed from overhead or astride of the local operator as the local operator moves through steps of the procedure at the make line.

In particular, the local device can record the video feed and transmit the live video feed to the computer system. The computer system can then stream (or "broadcast") the live video feed—such as in a raw, annotated, or censored format—to a remote viewer during the instance of the procedure, thereby enabling the remote viewer to monitor and verify steps of the procedure in real-time but remotely from the make line and/or remotely from the facility altogether.

4.1 Instruction Video Feed

Generally, in one variation of the method S100, the system accesses video feeds recorded by an optical sensor during performance of the digital procedure.

In one implementation, the system can retrieve instruction video feeds directly from an optical sensor, such as located at the mobile device of the operator, in real-time during performance of the digital procedure in response to initiating the first instructional block in the digital procedure. Additionally or alternatively the system can retrieve instruction video feeds recorded by the optical sensor, uploaded from the optical sensor to a file system via a computer network, and stored in an instruction video database. In this implementation, the system can retrieve the instruction video in a particular video format, such as a continuous video stream depicting the operator performing instructional blocks of the digital procedure; and/or individualized video clips, each depicting performance of a particular instructional block in the digital procedure. Additionally, the instruction video feed can be captured from the optical sensor, such as during performance of the digital procedure at the facility, during testing of instructional blocks at a test facility, and/or during a calibration routine. In one variation of this implementation, multiple optical sensors can be utilized where the system records multiple angles and views of the same event and the platform can build an instructional block consisting of one or multiple sensor devices. The optimal video resolutions, distance, angles, and relevance to the procedure steps can be selected as the primary content of the instructional block that the operator is able to view when linked to a step. The instructional block can further include additional content (e.g., images, manifest of objects) contained within the instructional block, linked to the instructional block, or deleted.

In this implementation, the mobile device can include: a visible light camera (e.g., a RGB CMOS, or black and white CCD camera) that captures instruction video feeds (e.g., digital color video feeds) of an operator located at an operator cell within the facility performing instructional blocks of the digital procedure; and a data bus that offloads instruction video feeds, such as to a local or remote database. The mobile device associated with the operator can additionally or alternatively include multiple visible light cameras, one or more infrared cameras, thermal imaging cameras, etc.

In one example, upon receipt or retrieval of an instruction video feed, the system can: implement computer vision techniques (e.g., object recognition, edge detection, etc.) to identify objects—such as hands of operators and equipment units—depicted in the instruction video feed to identify a perimeter or boundary of these objects; and crop the instruction video feed around these objects such that only features corresponding to these objects are extracted from the instruction video feed. The system can thus, aggregate instruction video feeds for instructional blocks of a digital procedure performed within the facility, wherein each instruction video feed captures visual characteristics of a unique performance of an instructional block in a digital procedure.

Therefore, the system can: access an instruction video feed depicting performance of a modifiable digital procedure in preparation to extract features from the instruction video feed depicting the operator performing instructions deviating from instructional blocks of a current instance of the digital procedure.

In another implementation, the system can access a combination of instruction video feeds and instruction images recorded during performance of the digital procedure. In one example, the system can extract instruction images from instruction video feeds by identifying video frames (i.e., static images extracted from the video feed) in the instruction video feeds corresponding to performance of particular instructional blocks in a digital procedure.

4.1.1 Audio Feed

Block S122 of the method S100 recite accessing a first audio feed captured by a local device interfacing with a local operator during performance of an instance of a procedure at a make line within the facility. In one implementation, the system can extract a first audio feed from the first video feed captured by the local device interfacing with the local operator during performance of the instance of the procedure at the make line within the facility. In this implementation, the system can include an audio sensor (e.g., condenser microphone, ribbon microphone): located at the local device at the make line within the facility; and/or coupled to the local operator preforming the instance of the procedure. Therefore, the system can access the first audio feed in order to retrieve audio phrases broadcasted proximal the make line, such as audible feedback from equipment units at the make line, audible instructions dictated by a supervisor to the local operator, and/or audible speech from the local operator during performance of the procedure.

5. Video Tagging

Blocks of the method S100 recites interpreting a first set of objects depicted in the first video feed based on features extracted from the first video feed in Block S150; and accessing a manifest of objects specified in the procedure in Block S160. As the computer system receives frames of the video feed from the local device, the computer system can implement artificial intelligence and/or computer vision techniques to automatically identify and label objects depicted in the video feed (e.g., in near real-time).

5.1 Object Recognition: Template Matching

In one implementation, the procedure includes a manifest of object types relevant to (e.g., involved in) the procedure, such as: a quantity of local operators; quantities and types of tools and equipment (e.g., scales, centrifuges, mixers, ovens, vacuum pumps); and quantities and package types of materials (e.g., liquids or powders in vials, bags, or five-gallon buckets).

In this implementation, the procedure can also include template images or template models (e.g., 3D models, color histograms) of these object types. For example, the computer system can: retrieve a video feed captured during a previous instance of the procedure; extract frame segments or clips depicting manually-labeled objects—involved in the procedure—from this previous video feed; generate template images and/or template models of these object types based on these frame segments or clips; and store these template images and/or template models for comparison to the live video feed captured during the current instance of the procedure.

Additionally or alternatively, a database can store a corpus of template images and/or template models of many object types, such as derived from frame segments or clips extracted from manually-labeled video feeds of instances of the same and/or other procedures previously completed at the same or other facility. The computer system can thus retrieve template images and/or template models of object types listed in the manifest of object types for the procedure.

During the current instance of the procedure, the computer system can: access the video feed from the local device; implement object detection and tracking techniques to distinguish individual objects in frames of the video feed and to track these individual objects across these frames; and implement template matching techniques to identify types of individual objects in the field around the local device during the current instance of the procedure based on template images and/or template models of object types specified in the manifest.

In particular, upon receipt of a frame of the video feed from the local device, the computer system can implement object detection techniques to distinguish individual objects in the frame. Then, for each object detected in the frame, the computer system can: extract a set of features representative of the object from the frame; and implement template matching techniques to match the set of features to template features represented in a template image or template model of an object in the manifest. In response to detecting a template image or template model that matches the object (e.g., with more than a threshold similarity score), the computer system can write a label specifying the object type of the matched template image or template model to the object depicted in the frame. (Additionally or alternatively, the computer system can write confidence scores for—similarity between the object depicted in the frame and template images or template models of known object types—to the object depicted in the frame). The computer system can then: implement object tracking techniques to track these objects over subsequent frames; repeat this process to (re)label object types of objects depicted in subsequent frames as objects move into and out of the field of view of the local device; and fuse types of objects interpreted over multiple frames of the video feed, such as to confirm or refine the detected type of each object.

The computer system can repeat this process over time to annotate individual frames of the video feed received from the local device during the current instance of the procedure. The computer system can then compile and store these annotated frames as an annotated video feed.

In one example, the system can initialize an object container associated with the first video feed and representing the first set of objects depicted in the first video feed. The system can then, for each object, in the first set of objects: detect a first constellation representing the object in the first video feed; and, in response to the first constellation of the object matching a particular object constellation of a particular object type within a threshold degree of confidence, store the object as the particular object type in the object container. Furthermore, the system can: query the object container for the manifest of objects specified in the procedure; identify a first subset of objects in the queried object container relevant to the procedure based on the manifest of objects; and flag the first subset of objects as relevant to the procedure in the object container.

Additionally or alternatively, the system can: identify a second subset of objects in the object container as absent from the manifest of objects specified in the procedure; and flag the second subset of objects for censorship in the object container. Therefore, the system can: fog selected objects relevant to the procedure in the video feed based on the first subset of objects; and fog the second subset of objects in the video feed in order to generate the censored video feed.

5.1.1 Generating the Manifest of Objects

In one implementation, the system can: generate the manifest of objects based on a video feed depicting the local operator performing a previous instance of the digital procedure; and access the generated manifest of objects during performance of a current instance of the procedure in order to identify objects relevant to the procedure. In this implementation, the system can: access a particular video feed captured by the local device interfacing with the local operator during performance of a prior instance of the procedure at the make line within the facility; and initialize a manifest object container associated with the particular video feed representing the manifest of objects for the procedure.

Additionally, the system can: extract a set of features from the particular video feed; and interpret a set of objects in the particular video feed based on the set of features extracted from the particular video feed. Furthermore, the system can, for each object in the set of objects: extract a fame segment from the particular video feed depicting the object; receive selection of an object type for the object by the local operator; and generate a template image for the object based on the frame segment and the selection of the object type. Subsequently, the system can store the template image, in a set of template images, within the manifest object container. Therefore, the system can access the template of images stored within the manifest object container in order to identify relevant objects to the procedure in subsequent instances of the procedure performed at the make line.

5.2 Local Operator Recognition

Additionally or alternatively, before beginning the current instance of the procedure, the local operator may don (i.e., apply, wear) a machine-readable operator identifier detectable by the computer system to identify and track the local operator within the video feed. For example, the local operator may: don a disposable glove, mask, clean suit, and/or hair cap that includes a QR code (e.g., a screen-printed QR code) or other visual identifier; or locate an operator badge—including a QR code, visual marker, or wireless identifier—on a lanyard on the local operator's neck or pinned to the local operator's breast or lapel. The local operator may also scan the identifier into the local device to log into the local device and initiate the current instance of the procedure.

During the current instance of the procedure, the computer system can thus: access the video feed from the local device; and implement computer vision techniques to identify and track the local operator in frames of the video feed based on the operator identifier.

Alternatively, the computer system can retrieve a (partial) faceprint of the local operator once the local operator logs in to the local device and prepares for the current instance of the procedure. Thus, throughout the current instance of the procedure, the computer system can: detect human faces in frames of the video feed; and implement facial re-recognition techniques to identify and track the local operator in these frames of the video feed based on the local operator's faceprint and characteristics of faces detected in the video feed.

However, the computer system can identify the operator based on any other unique or identifying features in the video feed, such as personal protective equipment.

5.3 Object Recognition: Unique Identifiers on Objects

In a similar implementation, the computer system detects and tracks machine-readable identifiers located on both the local operator and on other objects related to the procedure.

For example, the local operator may apply QR codes to individual objects—including the local operator as described above, individual machines and tools, material packages—at the start of and/or during the instance of the procedure. The local operator may then interface with the local device to scan these QR codes into the local device and to manually link these QR codes to types of objects specified in the manifest.

Additionally or alternatively, tools, equipment, and/or material packages within the facility can be prelabeled or supplied with QR codes and/or other machine-readable identifiers in place upon delivery to a location within the facility allocated for the current instance of the procedure. A database can store the types, characteristics, and unique machine-readable identifiers of these tools, equipment, and/or material packages. (The local operator can also interface with the local device to manually scan machine-readable identifiers of these tools, equipment, and/or material packaging at the make like and thus load these tools, equipment, and/or material packages into the current instance of the procedure.)

The computer system can thus: read these machine-readable identifiers from frames in the video feed; query the database for object types associated with these machine-readable identifiers; identify types of objects depicted in the video feed based on results returned by the database; and automatically label objects depicted in the video feed with their object types. The computer system can thus detect, identify, and track objects—related to the current instance of the procedure—within the video feed based on machine-readable identifiers arranged on these objects and visible in the video feed.

For example, for a frame of the video feed, the computer system can: implement object detection techniques to distinguish individual objects in the frame; detect QR codes within boundaries of individual objects in the frame; query the database to identify object types associated with these QR codes; and write object type labels to corresponding objects depicted within the frame. The computer system can then: implement object tracking techniques to track these objects over subsequent frames; repeat this process for subsequent frames as objects move into and out of the field of view of the local device; and fuse detected types of an object over multiple frames to confirm or refine the detected type of the object.

The computer system can repeat this process for multiple objects detected over multiple frames and compile these annotated frames into an annotated video feed.

5.4 Artificial Intelligence

In another implementation, the computer system trains a perception model based on videos of procedures—previously completed at the same or other facility with the same, similar, or dissimilar equipment and materials—containing frames (manually) labeled with object types. For example, the computer system can implement a generative adversarial network (or "GAN") to train a perception model to detect and identify objects common to or specified in procedures performed at the facility (and in other similar facilities).

In this implementation, the computer system can then implement artificial intelligence techniques and this perception model to automatically detect, track, and identify objects in the video feed; label objects in frames of the video feed accordingly; and compile these annotated frames into an annotated video feed.

In one example, the system can: extract a first frame from the video feed; and extract a second frame, following the first frame, from the video feed. Additionally, the system can: extract a first set of features from the first frame of the video feed; interpret a set of objects depicted in the video feed based on the first set of features extracted from the first frame; and extract a second set of features from the second frame of the video feed. The system can then implement artificial intelligence techniques to derive a set of object paths for the set of objects from the first frame to the second frame of the video feed based on differences between the second set of features extracted from the second frame and the first set of features extracted from the first frame.

Therefore, the system can: identify object paths for objects unrelated to the procedure depicted in the video feed; and fog these objects along their respective object paths in the video feed to generate the censored video feed.

5.5 Fusion

Additionally or alternatively, the computer system can concurrently execute each of the foregoing methods and techniques to detect, identify, and track objects depicted in the video feed, such as to accommodate for incomplete views, changing perspectives, and varying resolutions with which these objects are depicted in frames of the video feed as these objects move relative to the local device throughout the instance of the procedure.

Furthermore, in the foregoing implementations, the computer system can update types of objects detected over a sequence of frames of the video feed as the computer system accesses more data representative of these objects (e.g., sequences of frames depicting these objects over ranges of perspectives, distances, and positions in these frames). For example, the computer system can: track an object over multiple frames of the video feed; combine (e.g., average) confidence scores for various types of objects associated with the object over this sequence of frames; confirm the type of the object once the confidence score of a frontrunner object type exceeds a threshold score; and then label this object type in a contiguous sequence of frames of the video feed in which this object is continuously tracked.

The computer system can also flag objects in the annotated video feed—characterized by low confidence scores or failed object identification—for manual annotation by the local operator or the remote viewer, such as in real-time during the instance of the procedure.

5.6 Video Segmenting+Procedure Risk

In one implementation, the system can: extract video segments from the video feed corresponding to steps performed for the instance of the procedure; and identify objects relevant to performance of the procedure based on a risk factor assigned to steps of the procedure.

In particular the system can, access a digital procedure containing: a first instructional block including a first instruction of a first degree of risk; and a second instructional block including second instruction of second degree of risk greater than the first degree of risk. Additionally, the system can: extract a first video segment from the video feed corresponding to performance of the first instructional block in the procedure; and extract a second video segment, following the first video segment, from the first video feed corresponding to performance of the second instructional block in the procedure.

Furthermore, the system can: interpret a first set of objects depicted in the first video feed based on a first set of features extracted from the first video segment of the first video feed; and identify subsets of objects in the first set of objects that are unrelated to the procedure based on the first degree of risk assigned to the first instruction. Similarly, the system can: interpret a second set of objects depicted in the first video feed based on a second set of features extracted from the second video segment of the first video feed; and identify second subsets of objects in the second set of objects that are unrelated to the procedure based on the second degree of risk assigned to the second instruction.

Therefore, the system can selectively fog objects unrelated to the procedure within video segments of the video feed in order to generate a continuous censored video feed.

5.7 Audio Recognition

Blocks of the method S100 recite: detecting a first set of audio phrases in the first audio feed based on a first set of audio features extracted from the first audio feed Block S152; and accessing a manifest of audio phrases specified for the procedure in Block 164. In one implementation, the system can detect a first set of audio phrases in the first audio feed based on a first set of audio features extracted from the first audio feed. For example, the system can implement audio recognition techniques, such as hidden Markov models, dynamic time warping, and/or end end-to-end automatic speech recognition in order to derive a transcript for audio phrases during performance of the procedure. The system can therefore: interpret speech of the local operator during performance of the procedure; and selectively mute segments of the audio feed corresponding to speech of the local operator.

In this implementation, the procedure includes a manifest of audio phrase types relevant to (e.g., involved in) the procedure, such as audible feedback from equipment units at the make line, audible instructions dictated by a supervisor to the local operator, and/or audible speech from the local operator during performance of the procedure. Therefore, the system can: identify audio phrases—in the set of audio phrases—unrelated to the procedure based on this manifest of audio phrases; and mute (e.g., reduce volume) these audio phrases in the audio feed to generate a muted audio feed.

6. Video Filtering

Blocks of the method S100 recite: accessing a minimum censorship specification associated with performance of the instance of the procedure, the minimum censorship specification defining object types related to the procedure and corresponding to a first degree of censorship in Block S162; identifying a first subset of objects, in the first set of objects, depicted in the first video feed related to the procedure based on the object types defined in the minimum censorship specification and the manifest of objects in Block S170; identifying a second subset of objects, in the first set of objects, depicted in the first video feed unrelated to the instance of the procedure based on the manifest of objects in Block S172; and fogging the first subset of objects and the second subset of objects in the first video feed to generate a censored video feed in Block S180.

The computer system can access a minimum censorship specification to selectively censor (e.g., blur, fog, redact) objects depicted in frames of the video feed according to a degree of censorship defined in the minimum censorship specification. Thus the system can selectively censor objects in the video feed based on: relevance to the procedure; proximity to a location in the facility allocated for the current instance of the procedure; permissions of the user observing the video feed; a privacy policy and/or consent of operators in the facility; presence of personal identifiers or biometrics of operators in the video feed; and a level of confidentiality of information depicted in the video feed according to the degree of censorship in the minimum censorship specification.

6.1 Object Type

In one implementation, the computer system searches the manifest of object types specified in the procedure for the type of each object detected in a frame of the video feed. If the manifest returns a positive match for an object type detected in the frame, the computer system labels the object as relevant to the current instance of the procedure. Otherwise, the computer system labels the object as not relevant to the instance of the procedure.

The computer system can repeat this process for each other object detected in each other frame of the video feed in order to label all objects in all frames of the video feed with relevance to the current instance of the procedure.

6.2 Local Operator

In this implementation, the computer system can similarly: detect a set of human faces in a frame of the video feed; identify a particular human face in this frame as the local operator (e.g., by implementing facial re-recognition techniques or linking this face to a nearby machine-readable identifier near this face and linked to this local operator); label this particular human face as the local operator and relevant to the current instance of the procedure; and label each other human face detected in the frame as an object (or specifically a human) not relevant to the instance of the procedure.

The computer system can repeat this process for each other object detected in each other frame of the video feed in order to label all human faces in all frames of the video feed with relevance to the current instance of the procedure.

6.3 Proximity

The computer system can also retrieve a floor area in the facility allocated to the instance of the procedure in the facility and define a virtual 3D boundary projected upwardly from this floor area.

In one implementation, the local device captures a 2D color video feed during the current instance of the procedure. In this implementation, for each 2D color frame of the 2D color video feed, the computer system can: project the virtual 3D boundary into the 2D color frame, such as based on a location and orientation of the local device within the facility and a known field of view of the local device at the time the 2D color frame was captured; isolate a subset of objects depicted in the frame outside of the virtual 3D boundary; and label the subset of objects as not relevant to (i.e., outside of) the instance of the procedure.

In another implementation, the local device captures a stereoscopic video feed during the current instance of the procedure. Accordingly, for each 3D stereoscopic frame of the stereoscopic video feed, the computer system can: project the virtual 3D boundary into the 3D stereoscopic frame, such as based on a location and orientation of the local device within the facility and a known field of view of the local device at the time the frame was captured or based on optical fiducials—at known locations in the facility—detected in the 3D stereoscopic frame; isolate a subset of objects depicted in the frame outside of the virtual 3D boundary; and label the subset of objects as not relevant to (i.e., outside of) the instance of the procedure.

In another implementation, the local device captures both a 2D color video feed and a 3D depth image feed. For each 2D color frame in the 2D color feed, the computer system: fuses the 2D color frame with its concurrent 3D depth image to form a 3D color image; projects the virtual 3D boundary into the 3D color image, such as based on a location and orientation of the local device within the facility and a known field of view of the local device at the time the frame was captured; isolates a subset of objects depicted in the 3D color image outside of the virtual 3D boundary; labels the subset of objects in the 3D color image as not relevant to (i.e., outside of) the instance of the procedure; and transfers these labels from the 3D color image back into the 2D color image.

In yet another implementation, the local operator places a set of cones, a fence, floor markers, and/or other optical fiducials about a region of the facility allocated for the current instance of the procedure. For each frame in the video feed, the computer system can thus: detect these markers in the frame of the video feed; locates a virtual boundary—representing a 3D volume containing this region of the facility allocated for the current instance of the procedure—over the frame based on locations of these markers detected in the frame; isolates a subset of objects depicted in the frame outside of the virtual boundary; and labels the subset of objects as not relevant to (i.e., outside of) the instance of the procedure.

The computer system can repeat any combination or permutation of the foregoing processes to label and isolate objects related and unrelated to the current instance of the procedure based on proximity of these objects to the make line or a location within the facility allocated for the current instance of the procedure.

6.4 Censoring

In one implementation, the computer system can censor (e.g., fog, blur, or redact) regions of frames in the video feed that depict objects thus labeled as not relevant to the instance of the procedure. In one example, the system can: selectively fog objects related to the procedure at a first opacity level defined in the minimum censorship specification; and fog objects unrelated to the procedure at a second opacity level greater than the first opacity level.

The computer system can then compile these censored frames into a censored video feed of the current instance of the procedure and store this censored video feed, such as with the raw and annotated video feeds described above, in a remote database.

6.5 Bounding Box

In one implementation, the system can: identify a first set of objects occupying a first region within the first video feed; and generate a first bounding box about the first region in the first video feed containing the first set of objects. Additionally, the system can: identify a second set of objects occupying a second region within the first video feed; and generate a second bounding box about the second region in the first video feed containing the second set of objects. Thus, the system can: fog a first area in the first video feed enclosed by the first bounding box and containing the first set of objects; and fog a second area in the first video feed enclosed by the second bounding box and containing the second set of objects in order to generate the censored video feed.

6.7 Audio Muting

In one implementation, the system can: extract an audio feed from the video feed captured by the local device interfacing with the local operator within the facility; generate a muted audio feed to selectively censor (e.g., lower volume) particular audio segments in the audio feed based on the minimum censorship specification; and serve the censored video feed containing the muted audio feed to the remote viewer portal. In this implementation, the system can: access the minimum censorship specification defining a first audio phrase type (e.g., operator speech) related to the procedure and corresponding to a particular degree of censorship; and identify a first set of audio phrases in the audio feed as corresponding to the first audio phrase type based on the minimum censorship specification.

Additionally or alternatively, the system can: access a manifest of audio phrases (e.g., step instructions, equipment unit feedback) specified in the procedure; and identify a second set of audio phrases in the audio feed as unrelated to the procedure based on the manifest of audio phrases. Therefore, the system can mute (e.g., lower volume) audio segments in the audio feed corresponding to the first set of audio phrases and the second set of audio phrases to generate the muted audio feed.

In one implementation, the system can: mute the first set of audio phrases in the first audio feed to a first volume level defined in the minimum censorship specification; and mute the second set of audio phrases in the first audio feed to a second volume level, less than the first volume level.

6.7 Example

In one example, the system can interpret: a first object in the video feed corresponding to a first equipment unit at the make line within the facility; and a second object in the video feed corresponding to a second equipment unit at the make line within the facility; and interpret a third object in the video feed corresponding to a face of the local operator. In this example, the system can access a manifest of objects specified in the procedure and including the first object corresponding to the first equipment unit.

Additionally, the system can access a minimum censorship specification defining a privacy object type representing personal identification of a local operator performing the procedure. Thus, the system can: identify the first object as related to the procedure based on the manifest of objects; and flag the first object as a non-censored object. Additionally, the system can: identify the second object as unrelated to the procedure based on the manifest of objects; and flag the second object for censorship. Furthermore, the system can: identify the third object representing the face of the local operator as corresponding to the privacy object type based on the minimum censorship specification; and flag the third object for censorship. Therefore, the system can: fog the second object in the video feed corresponding to the second equipment unit at the make line within the facility unrelated to the procedure; fog the third object in the first video feed corresponding to the face of the local operator; and generate a censored video feed depicting the fogged second object and the fogged third object.

7. Remote Viewer Live Video Feed

Block S190 of the method S100 recites serving the censored audio feed to a remote viewer portal accessed by a remote viewer. As described above, the computer system can stream the raw video feed of the current instance of the procedure to a remote viewer portal in real-time, thereby enabling the emote viewer to monitor and verify steps of the current instance of the procedure in real-time, but remotely from the make line and/or the facility altogether.

Alternatively, the computer system can stream the annotated video feed to the remote viewer in real-time during the current instance of the procedure, thereby: enabling the remote viewer to view the entire scene around the instance of the procedure as if the remote viewer were physically present in the facility; and enable the remote viewer to identify and correct missing or incorrect object labels while verifying steps of the current instance of the procedure via the live video feed.

Yet alternatively, the computer system can stream the censored video feed to the remote viewer portal, thereby: enabling the remote viewer to view a limited constellation of elements in the video feed that are relevant to the current instance of the procedure; while also obscuring other potentially-sensitive information not related to this current instance of the procedure from the remote viewer.

In one implementation, the computer system can: prompt the remote viewer, via the remote viewer portal, to supply her credentials; derive or access types of content available to the remote viewer in the live video feed based on the remote viewer's credentials; apply a set of filters to the annotated video feed to selectively censor objects visible in the live video feed based on the remote viewer's credentials; and stream this censored video feed—tuned for the remote viewer's credentials—to the remote viewer portal.

For example, the computer system can access and implement a set of predefined rules for accessing video feeds of procedures. For example, the set of predefined rules can specify no limit to visible content for facility managers or upper-level supervisors; accordingly, the computer system can stream an uncensored (e.g., raw) video feed to a remote viewer portal responsive to log-in by a facility manager or upper-level supervisor.

The set of predefined rules can also access to content specific to instances of procedures under verification by remote scientists and lower-level supervisors within the organization. Accordingly, responsive to a log-in by a remote scientist or lower-level supervisor at a remote viewer portal, the computer system can implement methods and techniques described above to: censor objects unrelated to an instance of the procedure depicted in the live video feed; censor objects that fall outside of a region of the facility allocated for an instance of the procedure depicted in the live video feed; censor all faces depicted in the live video feed; and stream this censored video feed to the remote viewer portal.

In this example, the set of predefined rules can also specify access to content specific to the procedure, but no access to personal local operator information for a contractee who contracted the procedure within the organization. Accordingly, responsive to a log-in by an affiliate of the contractee at a remote viewer portal, the computer system can implement methods and techniques described above to: censor objects unrelated to an instance of the procedure depicted in the live video feed; censor objects that fall outside of a region of the facility allocated for an instance of the procedure depicted in the live video feed; censor all faces depicted in the live video feed; and stream this censored video feed to the remote viewer portal.

In this example, the set of predefined rules can also specify access to content depicting all objects and actions occurring within a region of the facility allocated for a procedure but no access to personal local operator information for a government regulator. Accordingly, responsive to a log-in by a government regulator at a remote viewer portal, the computer system can implement methods and techniques described above to: censor objects that fall outside of a region of the facility allocated for an instance of the procedure depicted in the live video feed; censor all faces depicted in the live video feed; and stream this censored video feed to the remote viewer portal.

In another example, responsive to entry of override permissions (e.g., from an administrator, auditor, or regulatory body), the computer system can override object censorship specifications in the video feed; and return an uncensored version of the live or recorded video feed to the remote view portal.

In another example, when an operator depicted in a video feed requests post hoc access to the video feed, the computer system can: uncensored the operator's face and other identifying information in the video feed; apply all other censorship requirements based on the operator's data access permissions; and serve this version of the recorded video feed to the operator via the remote view portal.

In yet another example, the system can: receive selection to view the censored video feed at the remote viewer portal accessed by the remote viewer; access a remote viewer profile associated with the remote viewer and specifying a particular degree of censorship, less than the degree of censorship defined in the minimum censorship specification; and modify the minimum censorship specification to define a set of object types related to the procedure and corresponding to the particular degree of censorship of the remote viewer profile. The system can then: un-fog objects in the censored video feed based on the modified minimum censorship specification to generate a second censored video feed; and serve the second censored video feed to the remote viewer at the remote viewer portal. Similarly, the system can: un-mute audio phrases (e.g., increase volume) in a muted audio feed based on the modified minimum censorship specification to generate a second muted audio feed; and serve the second muted audio feed concurrent the second censored video feed to the remote viewer portal.

Therefore, the computer system can selectively apply censor filters to content visible in the live video feed in real-time based on characteristics and/or credentials of the remote viewer viewing the instance of the procedure at the remote viewer portal.

8. Real-Time and Preemptive Renditions

In one variation, the computer system: generates multiple live renditions of the video feed during the instance of the procedure, each depicting a different combination of censored objects based on combinations of various local operator privacy settings and remote viewer credentials; and stores these renditions in a remote database for later delivery to remote viewers based on their credentials.

For example, the computer system can generate: a first rendition including a raw video feed of the instance of the procedure; a second rendition including a video feed of the instance of the procedure with object and local operator annotations; a third rendition including a censored video feed with all objects not related to the instance of the procedure censored; a fourth rendition including a censored video feed with all objects outside of a region of the facility allocated for the instance of the procedure censored; a fifth rendition including a censored video feed with all objects either not related to or outside of a region of the facility allocated for the instance of the procedure censored; a sixth rendition including a censored video feed with all objects outside of a region of the facility allocated for the instance of the procedure censored and with all human faces censored; and/or a seventh rendition including a censored video feed with all objects outside of a region of the facility allocated for the instance of the procedure censored and with all human faces and torsos censored; etc.

Therefore, the computer system can preemptively generate multiple renditions of the instance of the procedure, such as in real-time and/or soon after completion of the instance of the procedure; and store these renditions in a remote database for later access by various remote viewers, such as a remote viewer for post hoc remote verification of steps of the procedure, a supervisor, a regulator, or a contractee. When a remote viewer later requests access to the instance of the procedure, the computer system can: retrieve the remote viewer's credentials or permissions; select a stored rendition that matches the remote viewer's credentials or permissions; and serve this rendition to the remote viewer's remote viewer portal with minimal latency.

9. Post-Hoc Renditions

Alternatively, the computer system can selectively generate a rendition based on credentials or permissions of a remote viewer who requests access to the instance of the procedure, such as in real-time during the instance of the procedure or following conclusion of the instance of the procedure.

For example, when a remote viewer requests access to the instance of the procedure, the computer system can: retrieve the remote viewer's credentials or permissions; select censorship requirements (e.g., fogging human faces, obscuring confidential information, redacting objects not related to the instance of the procedure or outside of an area of the facility allocated for the instance of the procedure) defined for the remote viewer's credentials or permissions; implement methods and techniques described above to generate a new rendition based on these censorship requirements; and serve this rendition to the remote viewer.

10. Privacy Changes

In one variation, the local device (or the computer system) prompts the local operator to select a privacy setting for the instance of the procedure, such as: no censorship (i.e., authorizing the computer system to show the local operator's face, torso, and limbs in renditions of the video feed); facial privacy (i.e., authorizing the computer system to show the local operator's torso and limbs but not her face in renditions of the video feed); or full privacy (i.e., not authorizing the computer system to show the local operator's face, torso, or limbs in renditions of the video feed). Furthermore, the computer system can interface with the local operator (e.g., through a local operator portal executing on the same or other local device) at a later time to modify the privacy setting for a particular instance of the procedure or for all procedures involving the local operator.

Additionally or alternatively, the computer system can retrieve an operator privacy policy defined by an organization (e.g., the facility). For example, the operator privacy policy can specify: no censorship for any procedure completed by a current employee; no censorship for any procedure completed within the last twelve months; facial privacy by default for a former employee if the procedure was completed outside of the last twelve months; and full privacy if elected by a former employee for a procedure completed outside of the last 24 months.

The computer system can then apply the current privacy setting set by the local operator and/or the operator privacy policy set by the organization to selectively detect, track, and censor the local operator's face, torso, and/or limbs, etc. in renditions of the video feed served to remote viewers in real-time during the current instance of the procedure and post hoc following completion of the current instance of the procedure.

Later, if the local operator modifies her privacy setting, if the organization modifies the operator privacy policy, and/or if the status of the instance of the procedure changes (e.g., if the instance of the procedure was performed more than twelve months prior), the computer system can selectively delete or discard stored renditions of the instance of the procedure that no longer meet the current minimum privacy settings set by the local operator or the organization.

Additionally or alternatively, the computer system can apply the current minimum privacy settings—set by the local operator or the organization—when generating a new rendition of the instance of the procedure responsive to a later request from a remote viewer, as described above.

11. Multiple Video Feeds+Multiple Local Operators

In one variation, the computer system can execute the foregoing methods and techniques for multiple concurrent video feeds recorded by one or more local devices during the current instance of the procedure.

Similarly, the computer system can execute the foregoing methods and techniques to apply individual privacy settings—set by multiple local operators involved in the current instance of the procedure—to renditions of one or more video feeds of the current instance of the procedure.

12. Step Deviations

Blocks of the method S100 recite: generating an instruction profile representing performance of the first instruction based on a first set of instruction features extracted from the first video feed in Block S130; and identifying a deviation in response to exceeding a threshold deviation between the instruction profile of the first instruction and a target instruction profile of the first instruction in the first instructional block in Block S40. Generally, the system can: detect a step deviation from particular instruction for the procedure based on the instruction profile and the target instruction profile; and censor objects in the video feed, unrelated to the procedure, responsive to detecting the deviation for a current instance of the procedure performed at the make line within the facility.

12.1 Instruction Profile

The method S100 further recites: extracting a first set of instruction features from the instruction video feed; and generating an instruction profile representing performance of the first instruction based on the first set of instruction features. Generally, the system can: identify multiple (e.g., "n" or "many") features representative of performance of the digital procedure in an instruction video feed; characterize these features over a duration of the instruction video feed, such as over a duration corresponding to performance of an instruction video feed in the digital procedure; and aggregate these features into a multi-dimensional feature profile uniquely representing performance of this digital procedure, such as duration of time periods, relative orientations, geometries, relative velocities, lengths, angles, etc. of these features.

In one implementation, the system can implement an instruction feature classifier that defines types of instruction features (e.g., corners, edges, areas, gradients, orientations, strength of a blob, etc.), relative positions and orientations of multiple instruction features, and/or prioritization for detecting and extracting these instruction features from the instruction video feed. In this implementation, the system can implement: low-level computer vision techniques (e.g., edge detection, ridge detection); curvature-based computer vision techniques (e.g., changing intensity, autocorrelation); and/or shape-based computer vision techniques (e.g., thresholding, blob extraction, template matching) according to the instruction feature classifier in order to detect instruction features representing performance of the digital procedure in the instruction video feed. The system can then generate a multi-dimensional (e.g., n-dimensional) instruction feature profile representing multiple features extracted for a duration in the instruction video feed.

In one example, the system can: in response to initialization of a first instructional block in a modifiable digital procedure retrieved by a mobile device associated with the operator, generate a prompt to the operator to record performance of the first instructional block; access an instruction video feed captured by an optical sensor such as coupled to an augmented reality headset, as described above, depicting performance of this first instructional block; and extract a set of features from the instruction video feed. The system can then: identify a set of objects in the instruction video feed based on the set of features, such as hands of an operator, equipment units handled by the operator during performance of the first instructional block, a string of values on a display of an equipment unit; and generate an instruction profile for the first instructional block including the set of objects identified in the instruction video feed.

Therefore, the system can: identify objects in instruction video feeds associated with performance of instructional blocks in the digital procedure; represent these objects in an instruction profile; and confirm presence of pertinent objects necessary for performing the digital procedure based on the instruction profile.

Furthermore, in this implementation, the system can interpret actions carried out by an operator during performance of instructional blocks of the digital procedure based on the set of features extracted from the instruction video feed. In one example of this implementation, the system can: identify a first object (e.g., a flask) in the instruction video feed associated with performance of the first instructional block in the digital procedure; identify a second object (e.g., hand of an operator handling the first object and/or equipment units) in the instruction video feed associated with performance of the first instructional block in the digital procedure; and track relative positions, paths, and velocities of these objects for a duration in the instruction video feed corresponding to performance of the first instructional block. The system can then implement template matching techniques for these relative positions, paths, velocities of these objects in order to identify actions performed by the operator in the instruction video feed (e.g., filling the flask with a liquid substance). The system can then generate the instruction profile including the first object, the second object, and motion (e.g., velocities, path, location) of these objects during performance of the digital procedure.

Therefore, the system can: interpret actions carried out by operators depicted in the instruction video feed; represent these actions in an instruction profile for instructional blocks of the digital procedure; and confirm presence of actions necessary for performing instructional blocks of the digital procedure based on the instruction profile.

12.1.1 Target Instruction Profile

In one implementation, the system can execute Blocks of the method S100 to: generate a target instruction profile for instructional blocks of a digital procedure representing ideal performance of these instructional blocks; populate instructional blocks of the digital procedure with a target instruction profile for each instructional block in the digital procedure. In particular, the system can: retrieve a first instruction for each instructional block of a digital procedure in a video format corresponding to a high degree of guidance for performing the first instruction as described above; extract a set of target instruction features from the video format of the first instruction; generate a target instruction profile based on the set of target instruction features representing ideal performance of the first instruction, such as target time duration, target object presence, target object path, target values from equipment units, etc.; and populate each instructional block for the digital procedure with the target instruction profile. Therefore, the system can: generate target instruction profiles for instructional blocks of a digital procedure; and, during performance of an instance of the digital procedure, identify deviations from a current instruction profile to the target instruction profile; and automatically modify the instructional block in response to identifying these deviations.

In another implementation, the system can: generate the target instruction profile based on a video feed from a previous instance of the procedure performed at the make line; and store this generated target instruction profile in instructional blocks of the digital procedure. In this implementation, the system can access a video feed captured by the local device interfacing with the local operator during performance of a prior instance of the first instruction block at the make line within the facility. The system can then: extract a set of instruction features from the video feed; initialize a template instruction profile; identify a set of objects depicted in the video feed based on the set of instruction features; identify a set of object paths for the set of objects in the video feed based on the set of instruction features; and identify a set of object types for the set of objects. Furthermore, the system can store: the set of objects, the set of object paths, and the set of object types in the template instruction profile to define the target instruction profile for the first instruction block in the display procedure.

12.2 Step Deviations: Object Presence

In one implementation, the system can identify a deviation in an instance of the first instruction performed at the make line by a local operator in response to identifying absence of objects related to the first instruction in the instruction profile. In particular, the system can detect a constellation of objects in the video feed based on the set of instruction features extracted from the video feed. Additionally, for each object in the constellation of objects, the system can: identify an object type in response to a constellation of the object matching a target object constellation of a particular object type within a threshold degree of confidence; and store the object of the particular object type in the instruction profile to define the set of objects depicted in the first video feed.

In the aforementioned implementation, the system can further: extract a particular object type from the target instruction profile related to performance of the first instruction; query the set of objects in the first instruction profile for the particular object type; and identify a deviation between the instruction profile and the target instruction profile in response to detecting absence of the particular object type in the first set of objects.

12.3 Step Deviations: Object Paths

In one implementation, the system can identify a deviation in an instance of the first instruction performed at the make line by a local operator in response to identifying object paths in the instruction profile deviating from target object paths. In particular, the system can: extract a first frame from the first video feed; and extract a second frame, following the first frame, from the first video feed. Additionally, the system can: extract a first set of features from the first frame of the first video feed; interpret a first set of objects depicted in the first frame of the first video feed based on the first set of features; and extract a second set of features from the second frame of the first video feed. Thus, the system can: derive a first set of object paths for the first set of objects from the first frame to the second frame based on differences between the second set of features extracted from the second frame and the first set of features extracted from the first frame; and store the first set of object paths in the first instruction profile.

In the aforementioned implementation, the system can further: extract a target set of object paths from the target instruction profile related to performance of the first instruction; and identify the deviation between the first instruction profile and the target instruction profile in response to the first set of object paths deviating from the target set of object paths.

12.4 Step Deviations: Target Value

In one implementation, the system can identify a deviation in an instance of the first instruction performed at the make line by a local operator in response to a value extracted form an equipment unit at the make line deviating from a target value. In particular, the system can: detect an equipment unit in the video feed based on the set of instruction features; and generate a bounding box in the video feed enclosing the equipment unit. Thus, the system can: interpret a value (e.g., temperature value, weight value) output from a display on the equipment unit based on a subset of instruction features, in the set of instruction features, extracted from an area within the bounding box; and store the value in the first instruction profile.

In the aforementioned implementation, the system can further: extract a target value for the first equipment unit from the target instruction profile; and identify a deviation between the first instruction profile and the target instruction profile in response to the first value deviating from the target value.

12.5 Step Deviations: Operator Action

In one implementation, the system can: interpret actions (e.g., picking up objects, selecting a particular button at the equipment unit) performed at the make line based on the set of instruction features extracted from the first video feed; and identify a deviation in the current instance of the procedure in response to the interpreted actions deviating from a target action specified in the instructional block.

In one example, the system can: detect a first object in the video feed corresponding to a hand of the local operator based on the set of instruction features; and detect a second object in the video feed corresponding to an instrument (e.g., flask) handled by the local operator. Additionally, the system can: track positions of the first object and the second object—during a first time period in the first video feed—depicted in the first video feed; interpret a first action (e.g., operator lifts flask) performed by the local operator based on tracked positions of the first object and the second object in the video feed; and store the first action in the first instruction profile.

In the aforementioned example, the system can further: extract a target action (e.g., operator interacts with equipment unit) for the local operator from the target instruction profile; and identify the deviation between the instruction profile and the target instruction profile in response to the first action deviating from the target action.

12.6 Step Deviations: Video Segmenting

In one implementation, the system can generate a video feed containing censored and non-censored video segments according to step deviations detected during performance of the procedure at the make line. In this implementation, the system can: access a first instructional block including a first instruction; and access a second instructional block including second instruction following the first instruction. The system can then: extract a first video segment from the first video feed in response to initializing the first instructional block; and extract a second video segment, following the first video segment, from the first video feed in response to initializing the second instructional block following completion of the first instructional block.

Furthermore, the system can: generate the first instruction profile based on a first set of instruction features extracted from the first video segment in the first video feed; and fog the first subset of objects in the first video segment of the first video feed to generate a first censored video segment.

In the aforementioned implementation, the system can further: generate a second instruction profile representing performance of the second instruction based on a second set of instruction features extracted from the second video segment in the first video feed; and identify a second deviation falling within a threshold deviation between the second instruction profile of the second instruction and a second target instruction profile of the second instruction in the second instructional block. Thus, the system can flag the second video segment as a non-censored video segment in response to identifying the second deviation falling within the threshold deviation.

Therefore, the system can serve the censored video feed to the remote viewer portal accessed by the remote viewer including the first censored video segment and the second non-censored video segment to focus attention of the remote viewer to relevant objects when viewing the deviation event in the censored video feed.

12.7 Step Deviations: De-Fogging Objects

In one implementation, the system can: retrieve a censored video feed—from a censored video feed library—associated with performance of a first instruction by the operator; and extract visual features from this retrieved censored video feed; and generate an instruction profile for the censored video feed representing performance of the first instruction. The system can then identify a deviation—for the first instruction performed in the censored video feed—exceeding a threshold deviation between the instruction profile and a target instruction profile retrieved from the first instructional block. In response to identifying this deviation, the system can then: modify the censored video feed to un-fog objects in depicted in the video feed related to performing the first instruction to generate an un-censored video feed; and serve this un-censored video feed to a remote viewer portal accessed by a remote viewer to confirm performance of the step-deviation in the video feed.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a operator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for distributing censored videos of a manufacturing procedure performed within a facility comprising:
at a first time, accessing a first video feed captured by a local device interfacing with a local operator during performance of an instance of the manufacturing procedure at a make line within the facility;
interpreting a first set of objects depicted in the first video feed based on features extracted from the first video feed;
accessing a manifest of objects associated with the manufacturing procedure;
accessing a minimum censorship specification associated with performance of the instance of the manufacturing procedure, the minimum censorship specification defining object types related to the manufacturing procedure and corresponding to a first degree of censorship;
identifying a first subset of objects, in the first set of objects, depicted in the first video feed related to the manufacturing procedure based on the object types defined in the minimum censorship specification and the manifest of objects;
identifying a second subset of objects, in the first set of objects, depicted in the first video feed unrelated to the instance of the manufacturing procedure based on the manifest of objects;
fogging the first subset of objects and the second subset of objects in the first video feed to generate a censored video feed; and
serving the censored video feed to a remote viewer portal accessed by a remote viewer.

2. The method of claim 1:
wherein interpreting the first set of objects depicted in the first video feed based on features extracted from the first video feed comprises:
initializing an object container associated with the first video feed and representing the first set of objects depicted in the first video feed; and
for each object, in the first set of objects:
detecting a first constellation representing the object in the first video feed; and
in response to the first constellation of the object matching a particular object constellation of a particular object type within a threshold degree of confidence, storing the object as the particular object type in the object container; and
wherein identifying the first subset of objects, in the first set of objects, depicted in the first video feed comprises:
querying the object container for the manifest of objects associated with the manufacturing procedure;
identifying the first subset of objects in the queried object container according to the object types defined in the minimum censorship specification; and
flagging the first subset of objects for censorship in the object container.

3. The method of claim 2:
wherein identifying the second subset of objects, in the first set of objects, depicted in the first video feed comprises:
identifying the second subset of objects in the object container as absent from the manifest of objects associated with the manufacturing procedure; and
flagging the second subset of objects for censorship in the object container; and
wherein fogging the first subset of objects and the second subset of objects to generate the censored video feed comprises, fogging the first subset of objects flagged in the object container and the second subset of objects flagged in the object container to generate the censored video feed.

4. The method of claim 1:
further comprising, accessing the manufacturing procedure containing:
a first instructional block comprising a first instruction of a first degree of risk; and
a second instructional block comprising second instruction of second degree of risk greater than the first degree of risk;
wherein accessing the first video feed captured by the local device interfacing with the local operator during performance of the instance of the manufacturing procedure comprises:
extracting a first video segment from the first video feed corresponding to performance of the first instructional block in the manufacturing procedure; and
extracting a second video segment, following the first video segment, from the first video feed corresponding to performance of the second instructional block in the manufacturing procedure;
wherein interpreting the first set of objects depicted in the first video feed comprises, interpreting the first set of objects depicted in the first video feed based on a first set of features extracted from the first video segment of the first video feed;
wherein accessing the minimum censorship specification associated with performance of the instance of the manufacturing procedure comprises, accessing the minimum censorship specification based on the first degree of risk for the first instruction in the first instructional block; and
wherein fogging the first subset of objects and the second subset of objects comprises, fogging the first subset of objects and the second subset of objects in the first video segment to generate a first censored video segment of the censored video feed.

5. The method of claim 4:
further comprising:
modifying the minimum censorship specification to define a second set of object types corresponding to a second degree of censorship, less than the first degree of censorship, based on the second degree of risk for the second instruction in the second instructional block;
identifying a third subset of objects, in the first set of objects, depicted in the second video segment based on the second set of object types defined in the modified minimum censorship specification; and
fogging the third subset of objects in the second segment of the first video feed to generate a second censored video segment of the censored video feed; and wherein serving the censored video feed to the remote viewer portal comprises serving the first censored video segment and the second censored video segment to the remote viewer portal accessed by the remote viewer.

6. The method of claim 1:
wherein accessing the first video feed captured by the local device interfacing with the local operator during performance of the instance of the manufacturing procedure comprises:
   extracting a first frame from the first video feed; and
   extracting a second frame, following the first frame, from the first video feed;
wherein interpreting the first set of objects in the first video feed comprises:
   extracting a first set of features from the first frame of the first video feed;
   interpreting the first set of objects depicted in the first video feed based on the first set of features extracted from the first frame;
   extracting a second set of features from the second frame of the first video feed; and
   deriving a first set of object paths for the first set of objects from the first frame to the second frame of the video feed based on differences between the second set of features extracted from the second frame and the first set of features extracted from the first frame;
wherein identifying the first subset of objects, in the first set of objects, depicted in the first video feed comprises identifying a first subset of object paths, in the first set of object paths, for the first subset of objects depicted in the first video feed; and
wherein fogging the first subset of objects and the second subset of objects in the first video feed comprises fogging the first subset of objects along the first subset of object paths in the first video feed to generate the censored video feed.

7. The method of claim 1:
further comprising:
   at a second time preceding the first time, accessing a second video feed captured by the local device interfacing with the local operator during performance of a prior instance of the manufacturing procedure at the make line within the facility;
   initializing a manifest object container associated with the second video feed representing the manifest of objects for the manufacturing procedure;
   extracting a second set of features from the second video feed;
   interpreting a second set of objects in the second video feed based on the second set of features extracted from the second video feed; and
   for each object in the second set of objects:
      extracting a fame segment from the second video feed depicting the object;
      receiving selection of an object type for the object by the local operator;
      generating a template image for the object based on the frame segment and the selection of the object type; and
      storing the template image, in a set of template images, within the manifest object container; and
wherein accessing the manifest of objects comprises accessing the set of template images stored within the manifest object container representing the manifest of objects for the manufacturing procedure.

8. The method of claim 1:
wherein interpreting the first set of objects depicted in the first video feed comprises:
   interpreting a first object, in the first set of objects, corresponding to a first equipment unit at the make line within the facility;
   interpreting a second object, in the first set of objects, corresponding to a second equipment unit at the make line within the facility; and
   interpreting a third object, in the first set of objects, corresponding to a face of the local operator;
wherein accessing the manifest of objects comprises accessing the manifest of objects comprising the first object specified in the manifest of objects;
wherein accessing the minimum censorship specification associated with performance of the instance of the manufacturing procedure comprises accessing the minimum censorship specification defining a privacy object type, in the first set of objects types, representing personal identification of the local operator; and
wherein identifying the first subset of objects, in the first set of objects, depicted in the first video feed comprises:
   identifying the first object, in the first set of objects, as related to the manufacturing procedure based on the manifest of objects;
   flagging the first object as a non-censored object;
   identifying the third object, in the first set of objects, as the privacy object type based on the minimum censorship specification;
   flagging the third object for censorship; and
   appending the third object to the first subset of objects depicted in the first video feed.

9. The method of claim 8:
wherein identifying the second subset of objects, in the first set of objects, depicted in the first video feed comprises:
   identifying the second object, in the first set of objects, as unrelated to the manufacturing procedure based on the manifest of objects;
   flagging the second object for censorship; and
   appending the second object to the second subset of objects depicted in the first video feed; and
wherein fogging the first subset of objects and the second subset of objects in the first video feed comprises:
   fogging the third object in the first video feed corresponding to the face of the local operator;
   fogging the second object in the first video feed corresponding to the second equipment unit at the make line within the facility unrelated to the manufacturing procedure; and
   generating a censored video feed depicting the fogged third object and the fogged second object.

10. The method of claim 1:
wherein identifying the first subset of objects, in the first set of objects, depicted in the first video feed comprises:
   identifying the first subset of objects occupying a first region within the first video feed; and
   generating a first bounding box about the first region in the first video feed containing the first subset of objects;
wherein identifying the second subset of objects, in the first set of objects, depicted in the first video feed comprises:
   identifying the second subset of objects occupying a second region within the first video feed; and generating a second bounding box about the second region in the first video feed containing the second subset of objects; and wherein fogging the first subset of objects and the second subset of objects in the first video feed comprises:

fogging a first area in the first video feed enclosed by the first bounding box and containing the first subset of objects;

fogging a second area in the first video feed enclosed by the second bounding and containing the second subset of objects; and generating the censored video feed depicting the fogged first area and the second fogged area.

11. The method of claim 1, wherein fogging the first subset of objects and the second subset of objects in the first video feed to generate the censored video feed comprises:

fogging the first subset of objects in the first video feed at a first opacity level defined in the minimum censorship specification; and fogging the second subset of objects in the first video feed at a second opacity level, greater than the first opacity level.

12. The method of claim 1, wherein serving the censored video feed to the remote viewer portal accessed by the remote viewer comprises:

at a second time following the first time, receiving selection to view the censored video feed at the remote viewer portal accessed by the remote viewer;

accessing a remote viewer profile associated with the remote viewer and specifying a second degree of censorship, less than the first degree of censorship defined in the minimum censorship specification;

modifying the minimum censorship specification to define a second set of object types related to the manufacturing procedure and corresponding to the second degree of censorship of the remote viewer profile;

un-fogging the first subset of objects in the censored video feed based on the modified minimum censorship specification to generate a second censored video feed; and serving the second censored video feed to the remote viewer at the remote viewer portal.

13. The method of claim 1:

wherein accessing the first video feed comprises extracting a first audio feed from the first video feed captured by the local device interfacing with the local operator during performance of the instance of the manufacturing procedure at the make line within the facility; and further comprising:

detecting a first set of audio phrases in the first audio feed based on a first set of audio features extracted from the first audio feed;

accessing a manifest of audio phrases associated with the manufacturing procedure;

identifying a first subset of audio phrases, in the first set of audio phrases, unrelated to the manufacturing procedure based on the manifest of audio phrases for the manufacturing procedure;

muting the first subset of audio phrases in the first audio feed to generate a muted audio feed; and appending the muted audio feed to the censored video feed; and wherein serving the censored video feed comprises serving the censored video feed containing the muted audio feed to the remote viewer portal accessed by the remote viewer.

14. The method of claim 13:

wherein accessing the minimum censorship specification comprises accessing the minimum censorship specification defining audio phrase types related to the manufacturing procedure and corresponding to a first degree of censorship;

further comprising, identifying a second subset of audio phrases, in the first set of audio phrases, related to the manufacturing procedure based on the audio phrase types defined in the minimum censorship specification and the manifest of audio phrases; and wherein muting the first subset of audio phrases in the first audio feed to generate the muted audio feed comprises muting the first subset of audio phrases and the second subset of audio phrases in the first audio feed to generate the muted audio feed.

\* \* \* \* \*